(12) United States Patent
Yamada

(10) Patent No.: US 11,557,018 B2
(45) Date of Patent: Jan. 17, 2023

(54) IMAGE PROCESSING APPARATUS AND COMPUTER-READABLE RECORDING MEDIUM STORING SCREEN TRANSFER PROGRAM

(71) Applicant: FUJITSU LIMITED, Kawasaki (JP)

(72) Inventor: Kohji Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/380,889

(22) Filed: Jul. 20, 2021

(65) Prior Publication Data

US 2022/0067873 A1 Mar. 3, 2022

(30) Foreign Application Priority Data

Sep. 2, 2020 (JP) .............................. JP2020-147530

(51) Int. Cl.
*G06T 1/20* (2006.01)
*G06T 1/60* (2006.01)
*G06F 3/14* (2006.01)
*G06F 9/50* (2006.01)

(52) U.S. Cl.
CPC .............. *G06T 1/20* (2013.01); *G06F 3/1431* (2013.01); *G06F 9/505* (2013.01); *G06T 1/60* (2013.01)

(58) Field of Classification Search
CPC . G06T 1/20; G06T 1/60; G06F 3/1431; G06F 9/505; G06F 3/1454; G06F 9/5044; G06F 2209/509; G09G 5/001; G09G 5/363; G09G 2340/0435; G09G 2360/08; G09G 2360/10; G09G 2370/022

USPC ......................................................... 345/501
See application file for complete search history.

(56) References Cited

U.S. PATENT DOCUMENTS

| 10,051,253 B1* | 8/2018 | Monastyrshyn ....... G06V 10/60 |
| 2012/0194542 A1* | 8/2012 | Matsui .................. H04N 19/17 |
| | | 345/619 |
| 2012/0236199 A1 | 9/2012 | Imai et al. |
| 2015/0229960 A1 | 8/2015 | Yamasaki et al. |
| 2015/0281699 A1 | 10/2015 | Miyamoto et al. |

(Continued)

FOREIGN PATENT DOCUMENTS

| JP | 2006-243324 A | 9/2006 |
| JP | 2012-195629 A | 10/2012 |
| JP | 2015-149040 A | 8/2015 |

(Continued)

*Primary Examiner* — Jacinta M Crawford
(74) *Attorney, Agent, or Firm* — ArentFox Schiff LLP

(57) ABSTRACT

An image processing apparatus of transferring a display image to a client machine, the display image being an image to be displayed on a display device associated with the client machine, the image processing apparatus including: a memory; and a processor coupled to the memory, the processor being configured to perform processing, the processing including: executing a first transfer process configured to transfer only moving image data as the display image; executing a second transfer process configured to transfer moving image data and still image data as the display image; and executing a control process configured to select either the executing of the first transfer process or the executing of the second transfer process, by using a frame rate of the display image and a state of a graphics processing unit (GPU) circuitry configured to perform a process related to an image.

9 Claims, 12 Drawing Sheets

(56) References Cited

U.S. PATENT DOCUMENTS

2016/0286222 A1    9/2016  Kazui et al.
2019/0132597 A1    5/2019  Yamada

FOREIGN PATENT DOCUMENTS

| JP | 2015-191630 A | 11/2015 |
| JP | 2016-184894 A | 10/2016 |
| JP | 2019-083396 A | 5/2019 |

* cited by examiner

IMAGE PROCESSING APPARATUS AND COMPUTER-READABLE RECORDING MEDIUM STORING SCREEN TRANSFER PROGRAM

CROSS-REFERENCE TO RELATED APPLICATION

This application is based upon and claims the benefit of priority of the prior Japanese Patent Application No. 2020-147530, filed on Sep. 2, 2020, the entire contents of which are incorporated herein by reference.

FIELD

The embodiments discussed herein are related to an image processing apparatus and a non-transitory computer-readable recording medium storing a screen transfer program.

BACKGROUND

In recent years, in order to suppress information leakage and improve security, virtual desktops that cause a virtual machine (server) over a cloud to execute a process are becoming widespread. In the virtual desktop, a screen transmitted from the virtual machine is displayed on a display of a client terminal, and the virtual machine is operated from the client terminal. In the virtual desktop, in order to improve user operability of a client, it is desired to improve a frame rate of screen transfer and reduce a network bandwidth to be used.

The virtual machine may use, for example, a dedicated graphics processing unit (GPU) when encoding the screen to be transmitted to the client.

Technologies related to the virtual desktop are described in the related art below.

Examples of the related art include as follows: Japanese Laid-open Patent Publication No. 2012-195629; Japanese Laid-open Patent Publication No. 2016-184894; Japanese Laid-open Patent Publication No. 2015-149040; Japanese Laid-open Patent Publication No. 2015-191630; Japanese Laid-open Patent Publication No. 2006-243324; and Japanese Laid-open Patent Publication No. 2019-083396.

Meanwhile, when the virtual machine performs the process in response to a request from the client, the virtual machine may use the GPU for another process other than screen encoding. The GPU may perform, for example, rendering of 3D CG, an image process such as a still image or a moving image, dedicated computation, or the like.

When the process using the GPU and the encoding of the screen are executed at the same time, a delay occurs in the response of the virtual machine, and the user operability of the client decreases.

One disclosure provides an image processing apparatus and a non-transitory computer-readable recording medium storing a screen transfer program that suppress degradation in user operability on a virtual desktop.

SUMMARY

According to an aspect of the embodiments, there is provided an image processing apparatus of transferring a display image to a client machine, the display image being an image to be displayed on a display device associated with the client machine. In an example, the image processing apparatus includes: a memory; and a processor coupled to the memory, the processor being configured to perform processing, the processing including: executing a first transfer process configured to transfer only moving image data as the display image; executing a second transfer process configured to transfer moving image data and still image data as the display image; and executing a control process configured to select either the executing of the first transfer process or the executing of the second transfer process, by using a frame rate of the display image and a state of a graphics processing unit (GPU) circuitry configured to perform a process related to an image.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First Embodiment

Figure 1:
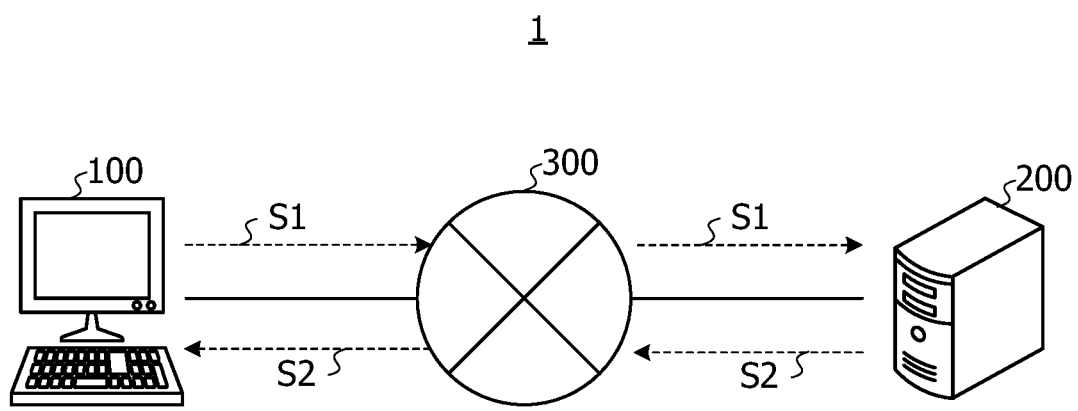
FIG. 1 illustrates a configuration example of a virtual desktop system.

A first embodiment will be described.
<Configuration Example of Virtual Desktop System 1>
FIG. 1 illustrates a configuration example of a virtual desktop system 1. The virtual desktop system 1 includes a client machine 100, a server machine 200, and a network 300. The virtual desktop system 1 is a system in which the server machine 200 executes a process in response to a request from the client machine 100.

The client machine 100 is an apparatus operated by a user, and is a computer or a server apparatus, for example. The client machine 100 recognizes, for example, a user operation such as an input by a keyboard or an operation of a mouse. The client machine 100 transmits contents of the user operation to the server machine 200 via the network 300 (S1).

The server machine 200 (image processing apparatus) is an apparatus that executes a process in response to a request from a cloud, and is a virtual machine or a server apparatus installed over the cloud, for example. When receiving the content of the user operation (the request from the client machine) from the client machine 100 (S1), the server machine 200 executes the process in response to the request. The server machine 200 regularly or irregularly encodes (performs encoding on) screen data to be displayed on a display unit such as a display of the client machine 100, and transmits the screen data to the client machine 100 via the network 300 (S2).

When receiving the screen data from the server machine 200 (S2), the client machine 100 decodes (performs decoding on) the screen data, and displays the screen data on the display unit such as the display included in the client machine 100.

As described above, the virtual desktop system 1 is a system in which the user operates the client machine 100 installed at hand to cause the server machine 200 installed at a remote location to execute the process, and to view a screen as a result of the operation on the display of the client machine 100. For example, the virtual desktop system 1 is a system in which another process other than the display or the operation is executed by the remote server machine 200 instead of the client machine 100.

<Configuration Example of Server Machine 200>

Figure 2:
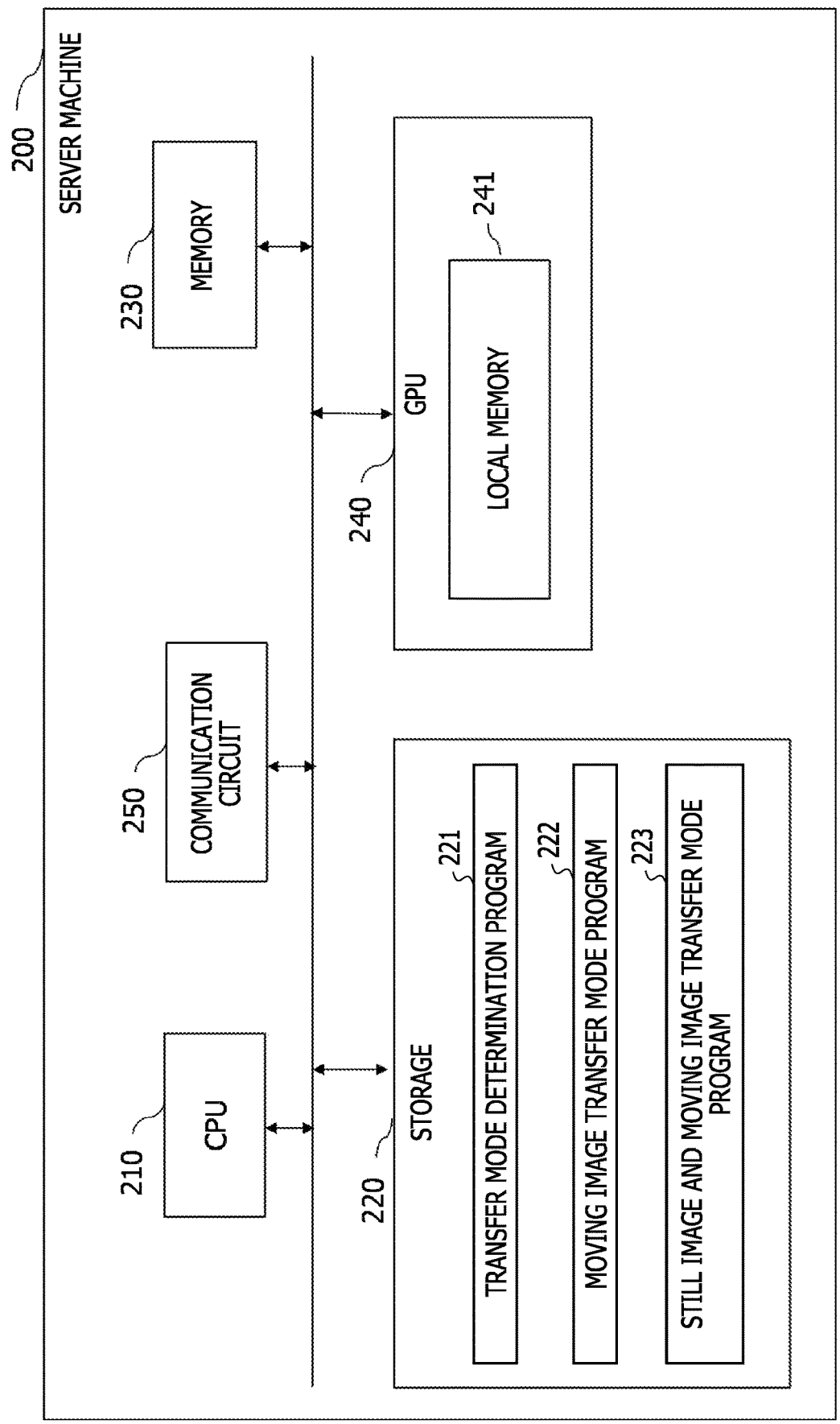
FIG. 2 illustrates a configuration example of a server machine.

FIG. 2 illustrates a configuration example of the server machine 200. The server machine 200 includes a central processing unit (CPU) 210, a storage 220, a memory 230, a communication circuit 250, and a GPU 240.

The storage 220 is an auxiliary storage apparatus, such as a flash memory, a hard disk drive (HDD), a solid-state drive (SSD), or the like for storing programs and data. The storage 220 stores a transfer mode determination program 221, a moving image transfer mode program 222, and a still image and moving image transfer mode program 223.

The memory 230 is a region into which the programs stored in the storage 220 are loaded. The memory 230 may also be used as a region in which the programs store data.

The CPU 210 is a processor that loads the programs stored in the storage 220 into the memory 230 and executes the loaded programs to construct units and to implement each process.

The GPU 240 has a local memory 241, and is a processor or an accelerator that loads the program stored in the storage 220 into the local memory 241 or the memory 230, and executes the loaded program to construct each unit and to realize each process. The GPU 240 performs, for example, an image process or a predetermined arithmetic operation process.

The local memory 241 is a region in which the program stored in the storage 220 is loaded. The local memory 241 may be used as a region in which the program executed by the GPU 240 stores data.

The communication circuit 250 is an apparatus that communicates with the client machine 100, and is a network interface card or a wireless communication circuit, for example.

The CPU 210 or the GPU 240 executes the transfer mode determination program 221 to constructs a control unit and to perform a transfer mode determination process. The transfer mode determination process is a process of determining a transfer mode for transferring an image to the client machine 100 based on a predetermined index. For example, the server machine 200 performs the transfer mode determination process when transferring a screen to the client machine 100. For example, the server machine 200 may regularly perform the transfer mode determination process.

The CPU 210 or the GPU 240 executes the moving image transfer mode program 222 to construct a first transfer unit and to perform a moving image transfer mode process. The moving image transfer mode process is a process of transmitting (transferring) only moving image data (moving image bitstream) to the client machine 100.

The CPU 210 or the GPU 240 executes the still image and moving image transfer mode program 223 to construct a second transfer unit and to perform a still image and moving image transfer mode process. The still image and moving image transfer mode process is a process of transmitting (transferring) both the moving image data (the moving image bitstream) and a still image data (still image bitstream) to the client machine 100.

<Configuration Example of Client Machine 100>

Figure 3:
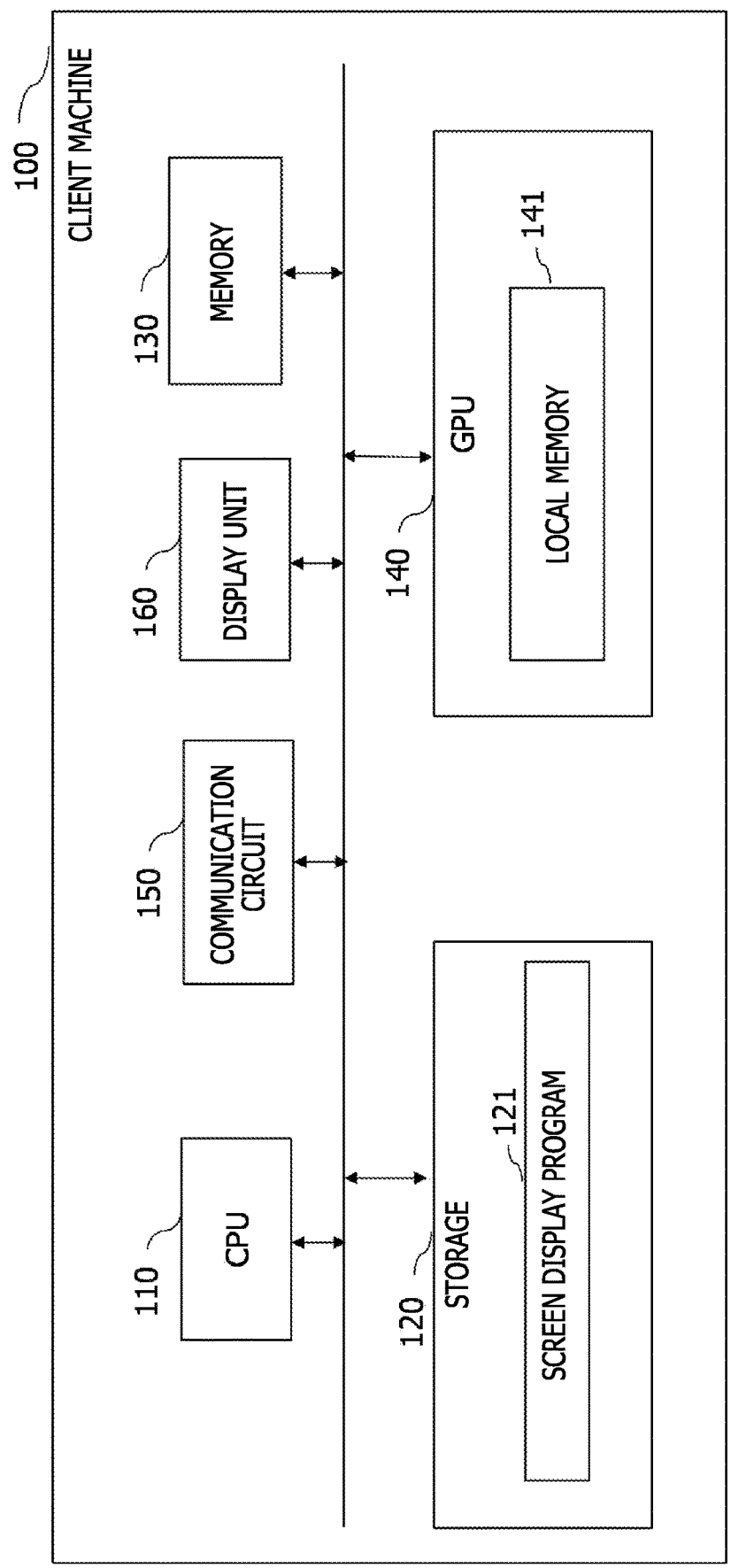
FIG. 3 illustrates a configuration example of a client machine.

FIG. 3 illustrates a configuration example of the client machine 100. The client machine 100 includes a CPU 110, a storage 120, a memory 130, a GPU 140, a communication circuit 150, and a display unit 160.

The storage 120 is an auxiliary storage apparatus, such as a flash memory, an HDD, or an SSD, for storing programs or data. The storage 120 stores a screen display program 121.

The memory 130 is a region to which the programs stored in the storage 120 are loaded. The memory 130 may be used as a region in which the programs store data.

The CPU 110 is a processor that loads the programs stored in the storage 120 to the memory 130 and executes the loaded programs to construct each unit and realize each process.

The GPU 140 has a local memory 141, and is a processor or an accelerator that loads the program stored in the storage 120 into the local memory 141 or the memory 130, and executes the loaded program to construct each unit and to realize each process. The GPU 140 performs, for example, an image process or a predetermined arithmetic operation process.

The local memory 141 is a region in which the program stored in the storage 120 is loaded. The local memory 141 may be used as a region in which the program executed by the GPU 140 stores data.

The communication circuit 150 is an apparatus that communicates with the server machine 200, and is a network interface card or a wireless communication circuit, for example.

The display unit 160 is a screen that displays an image. The display unit 160 is, for example, a display or a liquid crystal screen. The display unit 160 may be an apparatus integrated with the client machine 100, or may be an apparatus coupled to the client machine 100 in a wired or wireless manner.

The CPU 110 or the GPU 140 executes the screen display program 121 to construct a screen display unit and perform a screen display process. The screen display process is a process of displaying an image received from the server machine 200 on the display unit 160.

<Functional Configuration of Server Machine 200>

Figure 4:
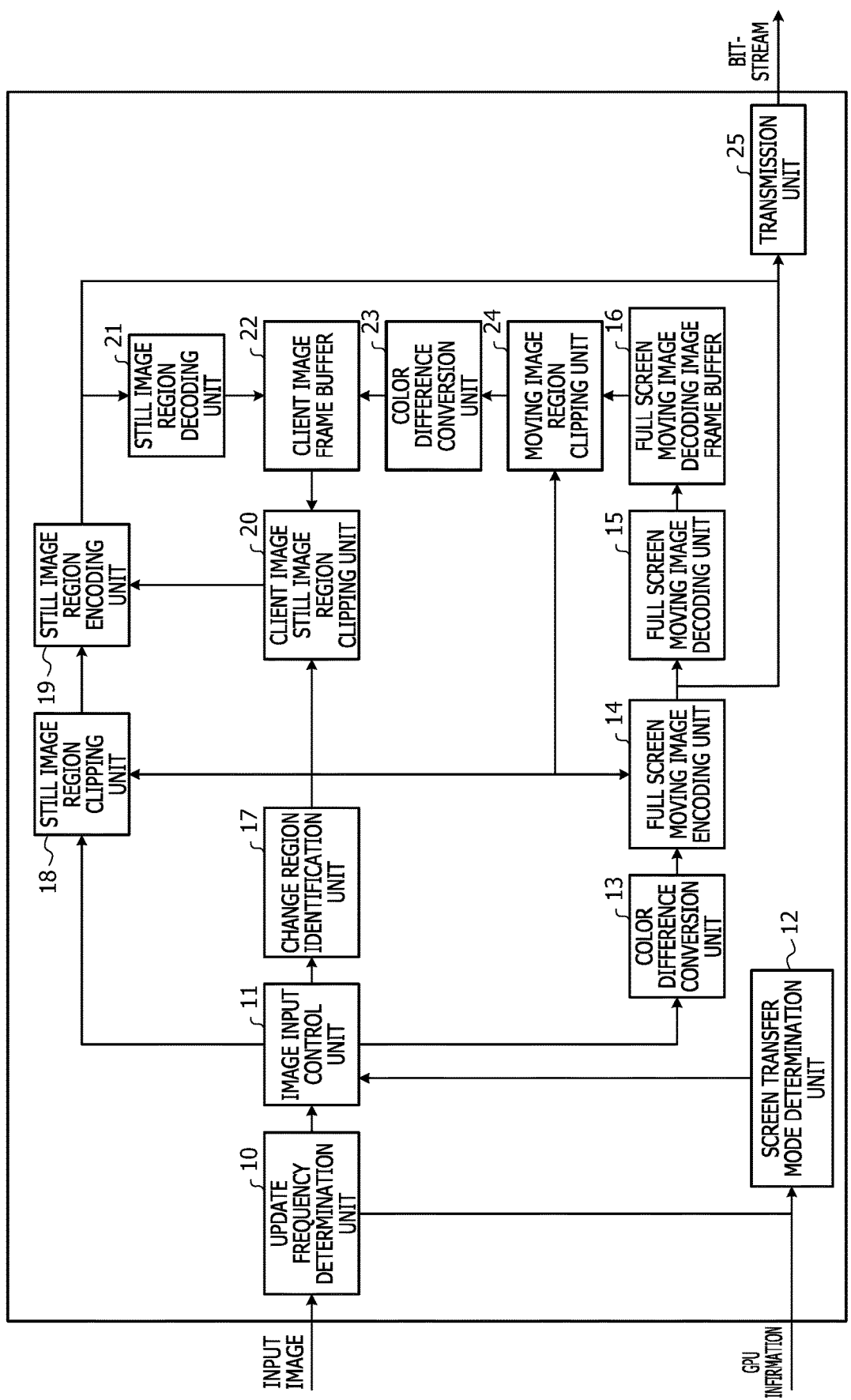
FIG. 4 illustrates an example of a functional configuration of the server machine.

FIG. 4 illustrates an example of a functional configuration of the server machine 200. The server machine 200 includes an update frequency determination unit 10, an image input control unit 11, a screen transfer mode determination unit 12, a color difference conversion unit 13, a full screen moving image encoding unit 14, a full screen moving image decoding unit 15, and a full screen moving image decoding image frame buffer 16. The server machine 200 further includes a change region identification unit 17, a still image region clipping unit 18, a still image region encoding unit 19, a client image still image region clipping unit 20, a still image region decoding unit 21, a client image frame buffer 22, a color difference conversion unit 23, a moving image region clipping unit 24, and a transmission unit 25.

The update frequency determination unit 10 determines an update of an image (desktop image) to be transmitted to the client machine 100. For example, the image to be transmitted is divided into a plurality of rectangles, and the determination of an update frequency is executed for each of the divided sections.

When a screen transfer mode is a moving image and still image transfer mode, the image input control unit 11 inputs an input image to a moving image encoder in a case where a moving image region exists, and inputs the input image to a still image encoder in a case where a still image region exists. On the other hand, when the screen transfer mode is a moving image transfer mode, the image input control unit 11 inputs the input image to the moving image encoder in a case where the moving image region exists. Details of the screen transfer mode will be described below.

The screen transfer mode determination unit 12 determines the screen transfer mode. The screen transfer mode is determined based on, for example, a processing load or a throughput of the GPU 240.

The color difference conversion unit 13 is a processing unit that converts a data amount related to colors of the input image. For example, the color difference conversion unit 13 converts moving image data transmitted in the moving image transfer mode and the still image and moving image transfer mode into an image format appropriate for an encoding method of the moving image data. For example, the color difference conversion unit 13 converts an image input in YUV444 having a color of high image quality (color difference pixel having high resolution) (the data amount is large) into YUV420 having a color of lower image quality (color difference pixel having low resolution) (the data amount is small) than YUV444. YUV420 and YUV444 are examples of YUV formats that are methods of expressing color information.

The full screen moving image encoding unit 14 encodes a full screen of the input image as a moving image, and outputs a moving image stream.

The full screen moving image decoding unit 15 decodes the moving image stream and outputs the decoded moving image (image of full screen).

The full screen moving image decoding image frame buffer 16 is a buffer that accumulates and stores decoded images of the full screen image. The stored image is used, for example, for comparison with the previous image or for clipping a part of the image.

The change region identification unit 17 classifies the input image into a moving image region and a still image region. The change region identification unit 17 calculates a frame rate from the number of encoded frames and a processing time.

The still image region clipping unit 18 clips an image of the still image region from the input image. The clipped still image region is a region determined as the still image region by the change region identification unit 17.

The still image region encoding unit 19 extracts a difference still image from the still image region of the input image by using an image of the client image frame buffer 22 as a reference image, performs encoding on the difference still image, and outputs a still image stream.

The client image still image region clipping unit 20 clips an image of a region to be a reference image of the still image region, from the client image stored in the client image frame buffer 22.

The still image region decoding unit 21 decodes the still image stream, adds the decoded still image stream to the reference image of the still image region, and stores the added reference image in the client image frame buffer 22.

The client image frame buffer 22 is a buffer that stores an identical image with the display image (the transmitted image) of the client machine. The stored image is used for extracting the presence or absence of an update of the image, extracting a difference from the previous image, or the like.

The color difference conversion unit 23 converts the clipped image of the moving image region from an image having a color of low image quality (color difference pixel having low resolution) to an image having a color of high image quality (color difference pixel having high resolution). The color difference conversion unit 23 performs conversion, for example, from YUV420 to YUV444.

The moving image region clipping unit 24 clips an image of the moving image region from the full screen moving image. The clipped image of the moving image region is, for example, a moving image region portion to be transferred in the still image and moving image transfer mode.

The transmission unit 25 transmits the moving image bitstream and the still image bitstream to the client machine 100.

Each unit is constructed by the GPU 240 executing a program. Each unit may be constructed by the CPU 210 executing a program. Each unit may be constructed by any one of the GPU 240 and the CPU 210. For example, the transmission unit 25 may be constructed by the CPU 210, and the other respective units may be constructed by the GPU 240.

<Transfer Mode Determination Process>

When transferring an image (client image) to the client machine 100, the server machine 200 executes a transfer mode determination process S100 of determining a transfer mode.

Figure 5:
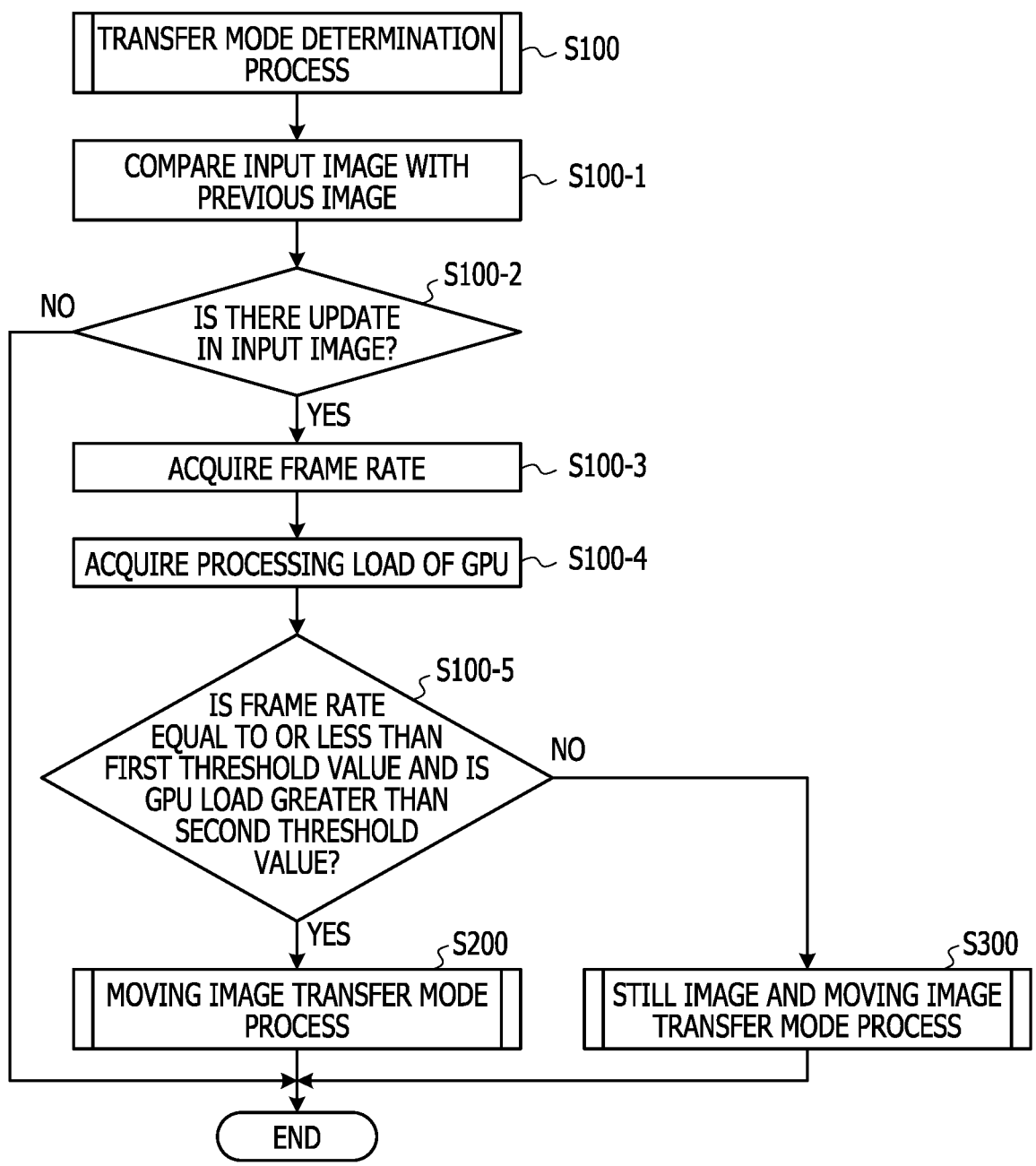
FIG. 5 illustrates an example of a processing flowchart of a transfer mode determination process.

FIG. 5 illustrates an example of a processing flowchart of the transfer mode determination process S100. In the transfer mode determination process S100, the server machine 200 compares an input image with the previous image (S100-1). In the process S100-1, information displayable on the client machine 100, such as movement of a mouse pointer, may be excluded from comparison targets.

In a case where the input image is not updated (is the same as the previous image) (No in S100-2), the server machine 200 does not transfer the image and terminates the process.

In a case where the input image is updated (Yes in S100-2), the server machine 200 acquires a frame rate (S100-3). The frame rate indicates the number of frames per unit time of an image transmitted by the server or displayed by the client. The frame rate may be, for example, the amount of processing that may be executed within a predetermined processing time, and in this case, the frame rate is a numerical value obtained by dividing the number of encoded frames by a time desirable for the encoding.

In a case where the frame rate is a frame rate in the client machine 100, the server machine 200 may acquire the frame rate from the client machine 100. The server machine 200 acquires the frame rate, for example, by receiving a message including the frame rate, from the client machine 100.

Next, the server machine 200 acquires a processing load of the GPU 240 (S100-4). The processing load of the GPU 240 is an operation rate of the GPU 240, and is acquired, for example, by executing a function that returns the processing load of the GPU 240 included in the GPU 240.

The server machine 200 determines a transfer mode based on the acquired frame rate and the processing load of the GPU 240 (S100-5). In a case where the frame rate is equal to or smaller than a first threshold value and the GPU processing load is larger than a second threshold value (Yes in S100-5), the server machine 200 selects the moving image transfer mode, executes the moving image transfer mode process (S200), and terminates the process.

The first threshold value is determined based on, for example, operability by the user. The lowest frame rate that does not reduce operability may be set as the first threshold value, based on past cases, experimental results, and the like.

The second threshold value is determined based on, for example, the processing time. For example, the processing time and the operation rate until a predetermined process is completed may be measured, and the highest operation rate among the allowable processing times may be set as the second threshold value.

In the determination process S100-5, "equal to or less than" may be "less than", and "greater than" may be "equal to or greater than".

On the other hand, in a case where the frame rate is not equal to or less than the first threshold value or the GPU processing load is equal to or less than the second threshold value (No in S100-5), the server machine 200 selects the still image and moving image transfer mode, executes the still image and moving image transfer mode process (S300), and terminates the process.

<Transfer Mode>

In the first embodiment, the server machine 200 differently uses the two transfer modes. The two transfer modes are the moving image transfer mode and the still image and moving image transfer mode.

The moving image transfer mode is a screen transfer mode in which only a moving image is transmitted to the client machine 100. The moving image in the moving image transfer mode is, for example, an image of YUV420.

On the other hand, the still image and moving image transfer mode is a screen transfer mode in which a still image and a moving image are transmitted to the client machine 100. For example, in the still image and moving image transfer mode, the moving image is YUV420, and the still image is YUV444. Hereinafter, the respective transfer modes will be described below.

<1. Moving Image Transfer Mode Process>

The moving image transfer mode is a mode in which only moving image data (moving image bitstream) is transmitted to the client machine 100.

Figure 6:
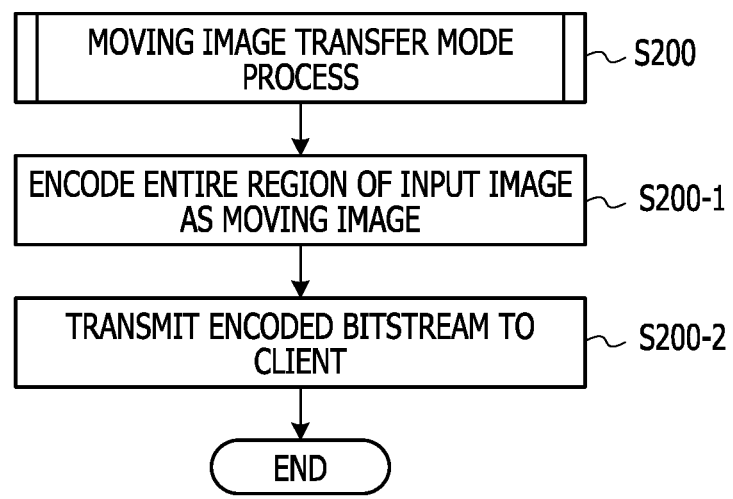
FIG. 6 illustrates an example of a processing flowchart of a moving image transfer mode process.

FIG. 6 illustrates an example of a processing flowchart of the moving image transfer mode process S200. In the moving image transfer mode process S200, the server machine 200 performs encoding on an entire region of an input image as a moving image (S200-1). The server machine 200 transmits a bitstream of the encoded moving image to the client machine 100 (S200-2), and terminates the process.

Figure 7:
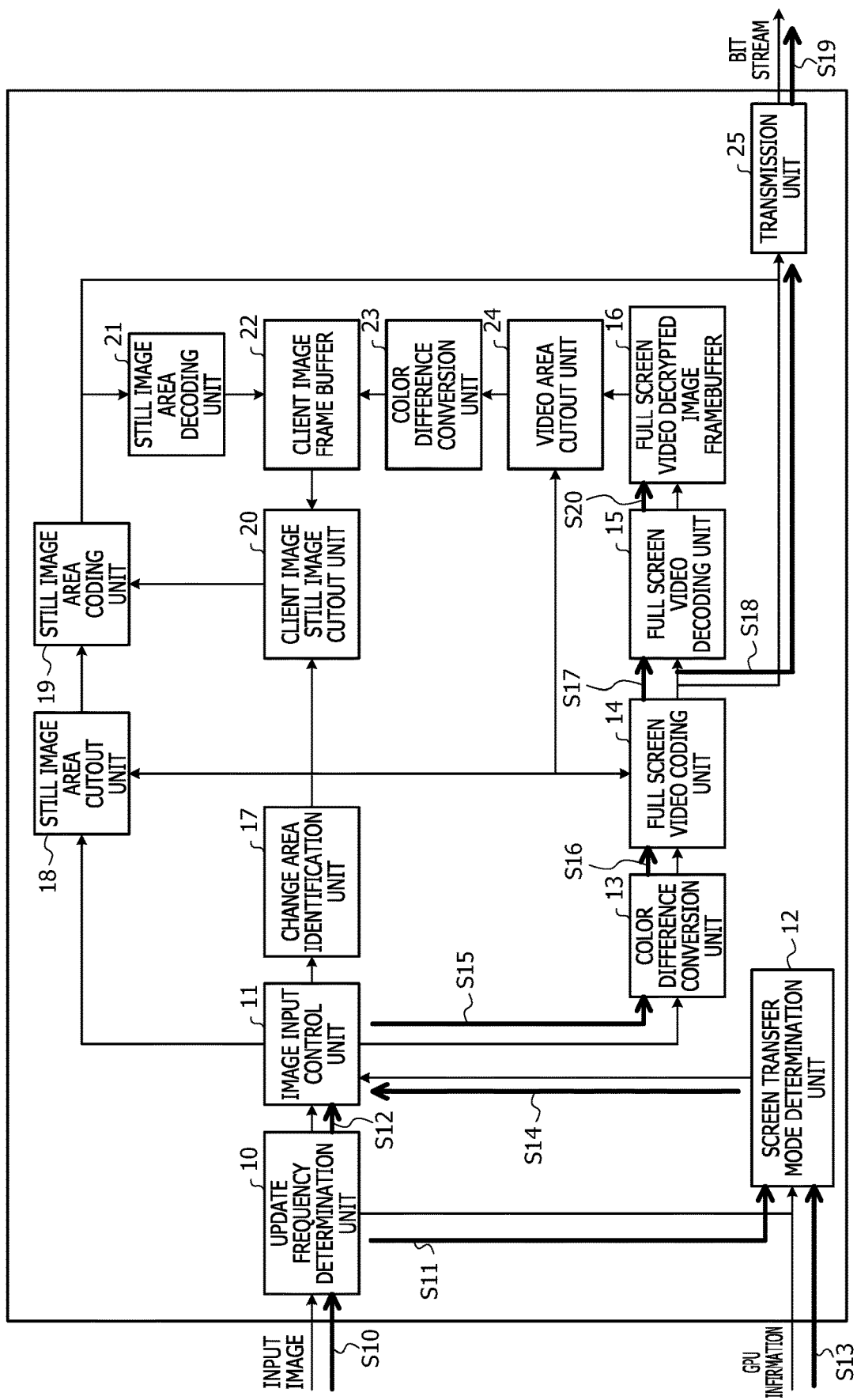
FIG. 7 illustrates an example of a sequence of the moving image transfer mode process.

FIG. 7 illustrates an example of a sequence of the moving image transfer mode process S200. FIG. 7 also includes the process until the server machine 200 selects the moving image transfer mode.

The server machine 200 inputs an image to the update frequency determination unit 10 (S10). The input image is, for example, a moving image having high image quality (for example, YUV444).

The update frequency determination unit 10 divides the input image into a plurality of rectangular regions. The update frequency determination unit 10 determines an update frequency for each of the divided regions. The update frequency determination unit 10 transmits a result of determining the update frequency for each of the divided regions, to the screen transfer mode determination unit 12 and the image input control unit 11 (S11 and S12).

The screen transfer mode determination unit 12 refers to the determination result of the update frequency to perform the process S100-1 and the process S100-2 in FIG. 5, and to check that the input image is updated (No in S100-2 in FIG. 5).

The screen transfer mode determination unit 12 acquires a frame rate (S100-3 in FIG. 5). The frame rate may be calculated by the screen transfer mode determination unit 12 or may be acquired from the change region identification unit 17. The screen transfer mode determination unit 12 acquires GPU information including a GPU processing load (S13 and S100-4 in FIG. 5).

The screen transfer mode determination unit 12 selects the moving image transfer mode based on the GPU processing load and the frame rate, and performs the moving image transfer mode process S200 (Yes in S100-5 in FIG. 5). The screen transfer mode determination unit 12 notifies the image input control unit 11 that the moving image transfer mode is selected (S14).

The image input control unit 11 starts the process in the screen transfer mode notified to the screen transfer mode determination unit 12. In FIG. 7, the moving image transfer mode process S200 is executed. The image input control unit 11 transmits the input image to the color difference conversion unit 13 (S15).

The color difference conversion unit 13 converts the input image from YUV444 to YUV420. The converted image is transmitted to the full screen moving image encoding unit 14 (S16).

The full screen moving image encoding unit 14 executes encoding on the received image to generate a moving image bitstream. The full screen moving image encoding unit 14 transmits the generated moving image stream to the full screen moving image decoding unit 15 and the transmission unit 25 (S17 and S18).

The transmission unit 25 transmits the moving image stream to the client machine 100 (S19).

The full screen moving image decoding unit 15 decodes the moving image stream and stores the decoded image (the moving image) in the full screen moving image decoding image frame buffer 16 (S20).

<2. Still Image and Moving Image Transfer Mode Process>

The still image and moving image transfer mode is a mode in which still image data and moving image data are transmitted to the client machine 100. For example, the still image data having a larger amount of information on color relationships (higher image quality) than the moving image data is used.

Figure 8:
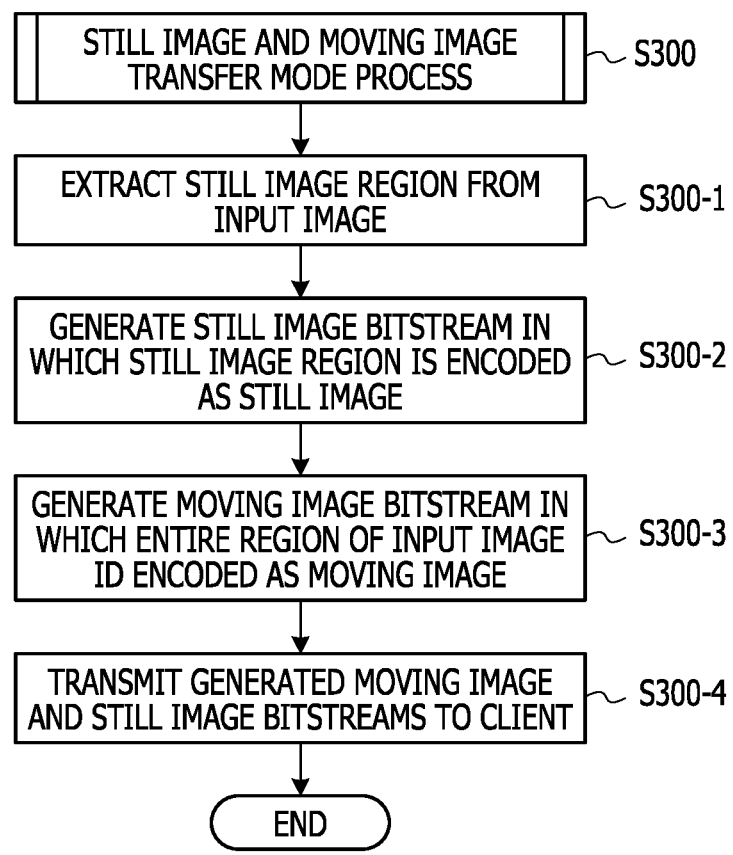
FIG. 8 illustrates an example of a processing flowchart of a still image and moving image transfer mode process.

FIG. 8 illustrates an example of a processing flowchart of the still image and moving image transfer mode process S300. The server machine 200 extracts a still image region from an input image in the still image and moving image transfer mode process S300 (S300-1).

Figure 9:
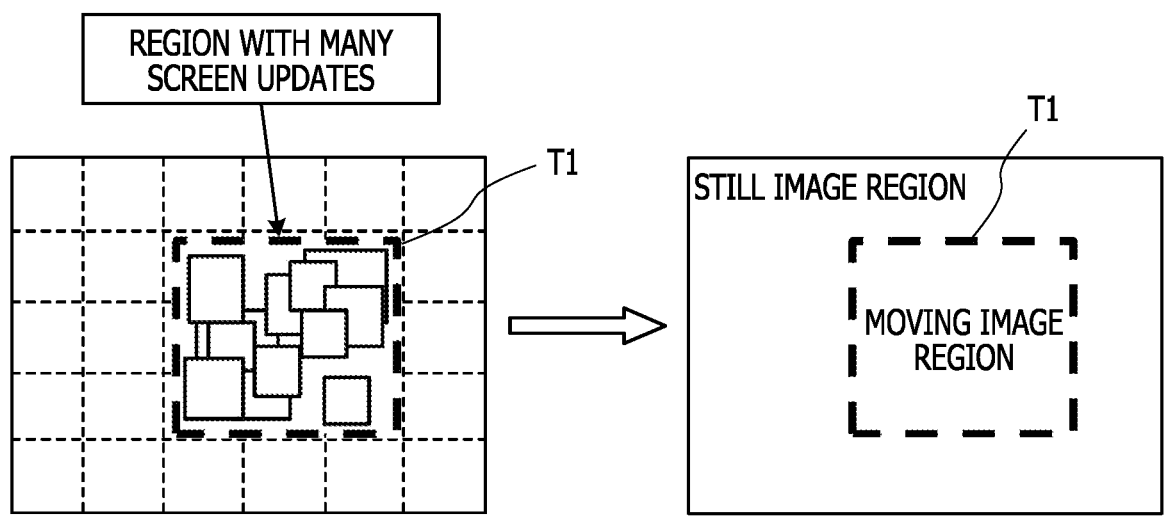
FIG. 9 illustrates an example of extracting a still image region.

FIG. 9 illustrates an example of extracting the still image region. The server machine 200 divides the input image into 30 rectangular regions arranged in 5 columns and 6 rows, as indicated by dotted lines in the left part of FIG. 9. The server machine 200 calculates an update frequency for each of the divided regions. For example, the server machine 200 determines that a region T1 including the nine divided regions is a region in which the number of screen updates is large, and determines that the region T1 is a moving image region. The server machine 200 determines a region other than the moving image region as a region with a small number of screen updates, and determines the region as the still image region. In the determination of the update frequency, for example, an image generated by the client machine 100 such as a mouse pointer or an image assumed to be recognizable by the client machine 100 may be excluded from the determination of the update frequency.

Referring back to the processing flowchart in FIG. 8, the server machine 200 generates a still image bitstream in which the still image region is encoded as a still image (S300-2).

The server machine 200 generates a moving image bitstream obtained by encoding the entire region of the input moving image as a moving image (S300-3). In Process S300-3, the moving image bitstream in which only the moving image region is encoded may be generated.

The server machine 200 transmits the generated bitstreams of the moving image and the still image to the client machine 100 (S300-4), and terminates the process.

Figure 10:
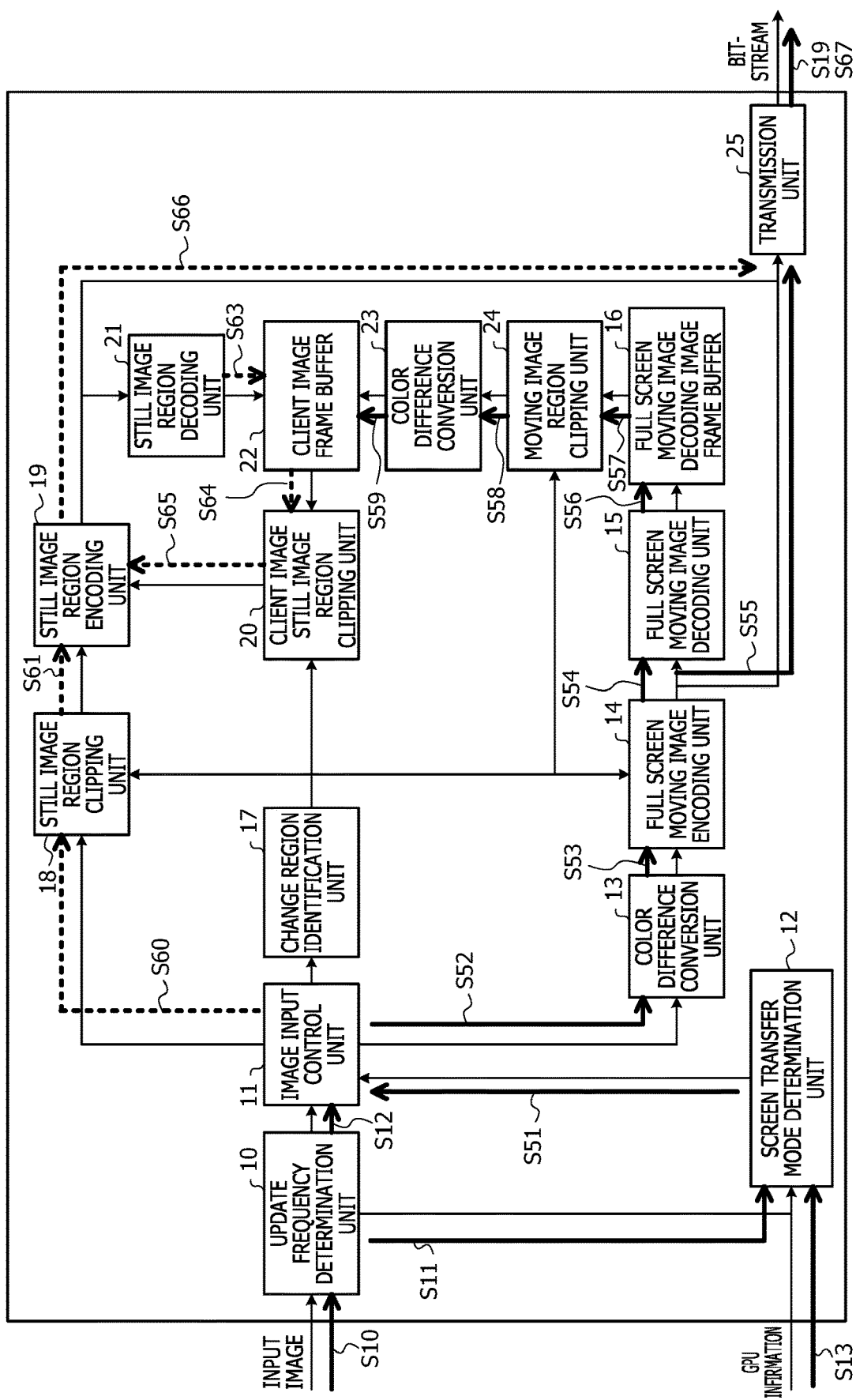
FIG. 10 illustrates an example of a sequence of the still image and moving image transfer mode process.

FIG. 10 illustrates an example of a sequence of the still image and moving image transfer mode process S300. FIG. 10 also includes the process until the server machine 200 selects the still image and moving image transfer mode. The processes S10 to S13 are the same as processes S10 to S13 illustrated in FIG. 7.

The screen transfer mode determination unit 12 selects the still image and moving image transfer mode based on the GPU processing load and the frame rate, and performs the still image and moving image transfer mode process S300 (No in S100-5 in FIG. 5). The screen transfer mode determination unit 12 notifies the image input control unit 11 that the still image and moving image transfer mode is selected (S51).

The image input control unit 11 starts the process in the screen transfer mode notified to the screen transfer mode determination unit 12. In FIG. 10, the still image and moving image transfer mode process S300 is executed. The image input control unit 11 transmits an input image to the color difference conversion unit 13 (S52). The process S52 to the process S59 are processes related to a moving image.

The color difference conversion unit 13 converts the input image from YUV444 to YUV420. The converted image is transmitted to the full screen moving image encoding unit 14 (S53).

The full screen moving image encoding unit 14 executes encoding on the received image to generate a moving image bitstream. The full screen moving image encoding unit 14 transmits the generated moving image stream to the full screen moving image decoding unit 15 and the transmission unit 25 (S54 and S55).

The transmission unit 25 transmits the moving image stream to the client machine 100 (S19).

The full screen moving image decoding unit 15 decodes the moving image stream and stores the decoded image (the moving image) in the full screen moving image decoding image frame buffer 16 (S56).

The moving image region clipping unit 24 extracts an image (moving image) from the full screen moving image decoding image frame buffer 16 (S57), and clips an image of the moving image region from the moving image of the full screen. The moving image region clipping unit 24 transmits the clipped image of the moving image region to the color difference conversion unit 23 (S58).

The color difference conversion unit 23 converts the image of the moving image region from YUV420 to YUV444, and stores the image in the client image frame buffer 22 (S59).

On the other hand, the image input control unit 11 transmits the input image to the still image region clipping unit 18 (S60). The process S60 to process S66 are processes related to a still image.

The still image region clipping unit 18 clips a still image region from the input image. The still image region is acquired, for example, from the change region identification unit 17. The still image region clipping unit 18 transmits the clipped still image region to the still image region encoding unit 19 (S61).

The still image region encoding unit 19 encodes the received still image region to generate a still image bitstream. The still image region encoding unit 19 transmits the generated still image bitstream to the transmission unit 25 (S66).

The still image region encoding unit 19 transmits the encoded still image bitstream to the still image region decoding unit 21 (S62).

The still image region decoding unit 21 decodes the received still image bitstream, and stores the decoded still image in the client image frame buffer (S63).

The client image still image region clipping unit 20 clips an image of a region to be a reference image of the still image region, from the client image stored in the client image frame buffer 22. The reference image is used as an image referred to when the still image region encoding unit 19 encodes the still image (S65).

The transmission unit 25 transmits the still image stream to the client machine 100 (S67).

The still image and moving image transfer mode may be an image transmission method described in Japanese Laid-open Patent Publication No. 2012-195629.

<Image Display Process>

Figure 11:
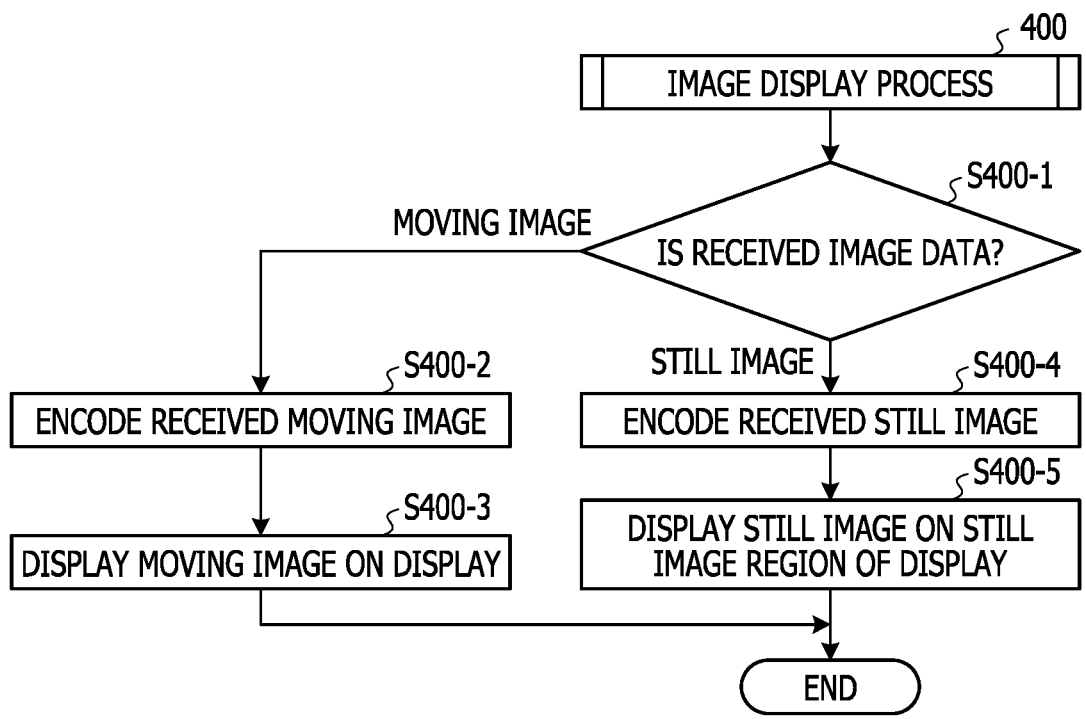
FIG. 11 illustrates an example of a processing flowchart of an image display process.

When receiving a bitstream, the client machine 100 performs an image display process S400. FIG. 11 illustrates an example of a processing flowchart of the image display process S400.

When receiving the bitstream of an image, the client machine 100 determines a type of the received image data (S400-1).

In a case where the bitstream is a moving image ("moving image" in S400-1), the client machine 100 decodes the received bitstream to generate a moving image (S400-2). The client machine 100 displays the generated moving image on a display unit such as a display (S400-3), and terminates the process.

On the other hand, in a case where the bitstream is a still image ("still image" in S400-1), the client machine-100 decodes the received bitstream to generate a still image (S400-4). The client machine 100 displays the generated still image on the display unit such as a display (S400-5), and terminates the process.

For example, when displaying the still image, the client machine 100 may update only a still image region over the display unit. This is because, for example, the already received moving image is displayed in a moving image region of the display unit.

For example, when displaying a moving image, the client machine 100 may update only the moving image region over the display unit. This is because, for example, the received still image is already displayed in a still image region of the display unit.

The client machine 100 determines a region in which there is no data of a moving image and a still image (a region in which there is no data as an image). For example, a region in which NULL data that is not used as image data is set may not be updated over the display unit. In order to perform such a process, between the client machine 100 and the server machine 200, it is predetermined that a region in which there is no data in a moving image bitstream indicates the still image region, a region in which there is no data in a still image bitstream indicates the moving image region, and the like, for example.

Although an example of the screen display process in the client machine 100 is described, the process is not limited to the process of the processing flowchart described above as long as the client machine 100 may perform the process so that moving image data is displayed in the moving image region and still image data is displayed in the still image region.

<Separation of Screen Transfer Mode>

As described above, the server machine 200 uses the screen transfer mode separately. In the moving image transfer mode, since a still image is not transmitted, the process related to the still image may be omitted, so that a processing amount of the GPU may be suppressed as compared with the still image and moving image transfer mode.

On the other hand, in the still image and moving image transfer mode, by setting a portion having a low update frequency as the still image region, the still image is transmitted. Since an image in the region having the low update frequency does not move (a change amount of the image is small), a roughness of the image (low image quality) is easily noticeable when viewed by the user of the client machine 100. On the other hand, since an image in a region having a high update frequency is moving (the change amount of the image is large), the roughness of the image is less noticeable than in the region having the low update frequency. For example, in the still image and moving image transfer mode, by making the still image region have high image quality, it is possible to provide an appropriate image in which the roughness of the image is less noticeable to the user of the client machine 100 as compared with the moving image transfer mode.

Figure 12A:
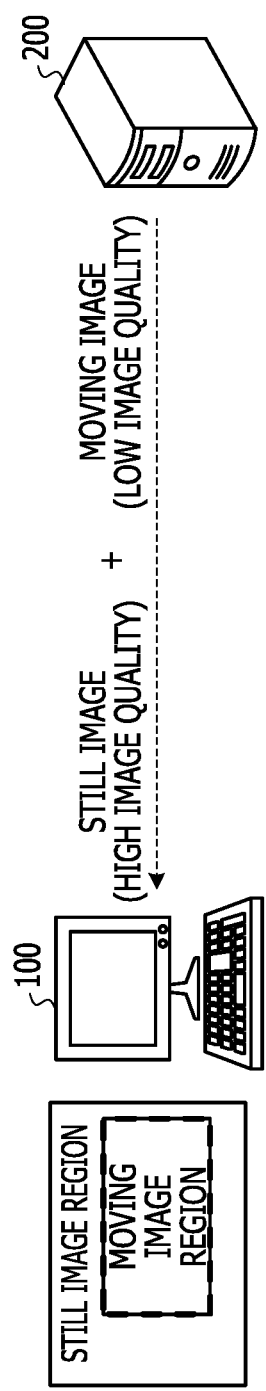
FIGS. 12A and 12B illustrate an example of separating a screen transfer mode.
Figure 12B:
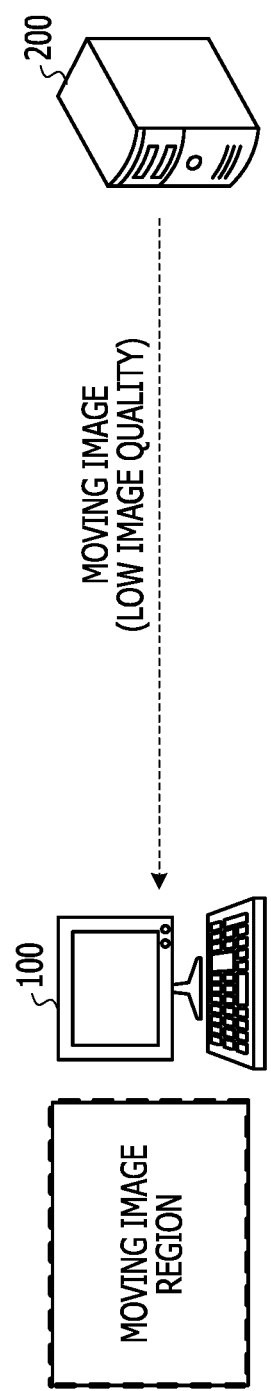

FIGS. 12A and 12B illustrate an example of separating a screen transfer mode. FIG. 12A illustrates an example of a still image and moving image transfer mode selected when a GPU load is low or a frame rate is high, and FIG. 12B illustrates an example of a moving image transfer mode selected when the GPU load is high and the frame rate is low.

As illustrated in FIG. 12A, when the load on the GPU is low or when the frame rate is high, a state in which there is still room for processing by the GPU (the GPU may execute more processes) is determined, and the still image and moving image transfer mode is executed in which a processing amount of the GPU is large but an image having high quality may be transmitted.

On the other hand, as illustrated in FIG. 12B, when the load on the GPU is high and the frame rate is low, a state in which there is no room for processing by the GPU (the processing amount of the GPU is to be reduced) is determined, and the moving image transfer mode is executed in which the image quality is lower as compared with the still image and moving image transfer mode, but the processing amount of the GPU may be reduced. In the moving image transfer mode, the entire display screen is a moving image region.

In this manner, the server machine 200 executes the moving image transfer mode in which the GPU processing load according to the GPU load and throughput is suppressed while trying to execute the high-quality still image and moving image transfer mode as much as possible. Thus, the server machine 200 may transmit the screen data with as high image quality as possible while ensuring operability for the user.

For example, in the case where only a high-quality moving image is transferred in the moving image transfer mode, the amount of data to be transmitted increases, and in the case where a delay occurs in communication between the client machine 100 and the server machine 200, a mismatch occurs between a screen viewed by the user on the client machine 100 and the process of the server machine 200, or a delay occurs in an operation on the server machine 200. Therefore, it is preferable to transmit a low-quality moving image in the moving image transfer mode so as not to cause a delay in communication.

Other Embodiments

For example, the still image may be encoded at a low compression rate, and the moving image may be encoded at a higher compression rate than the still image.

In the above embodiment, YUV444 is used as an example of high image quality and YUV420 is used as an example of low image quality, and color information of another YUV method may be used. A method other than the YUV method (for example, a YCbCr method or an RGB method) may be used.

Although the GPU processing load and the frame rate are used to determine the screen transfer mode in the first embodiment, for example, a memory bandwidth of the GPU may be used instead of the GPU processing load. Since a large memory bandwidth indicates that a large amount of data is (has to be) read from a memory per unit time, the memory bandwidth may be used as an index, in the same manner as the high processing load on the GPU.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus of transferring a display image to a client machine, the display image being an image to be displayed on a display device associated with the client machine, the image processing apparatus comprising:
a memory; and
a processor coupled to the memory, the processor being configured to perform processing, the processing including:
executing a first transfer process configured to transfer only moving image data as the display image;

executing a second transfer process configured to transfer moving image data and still image data as the display image; and executing a control process configured to select either the executing of the first transfer process or the executing of the second transfer process, by using a frame rate of the display image and a state of a graphics processing unit (GPU) circuitry configured to perform a process related to an image;

wherein the state of the GPU circuitry includes a processing load on the GPU circuitry, and the control process is configured to select the executing of the first transfer process in response that the processing load on the GPU circuitry is higher than a first threshold value and the frame rate is lower than a second threshold value.

2. The image processing apparatus according to claim 1, wherein the still image data transmitted in the second transfer process is an image having higher image quality than the moving image data transmitted in the first transfer process and the second transfer process.

3. The image processing apparatus according to claim 1, wherein the still image data transmitted in the second transfer process is an image in a region having a low update frequency, in the display image.

4. The image processing apparatus according to claim 1, wherein a first processing amount of the GPU in the first transfer process is larger than a second processing amount of the GPU in the second transfer process.

5. The image processing apparatus according to claim 1, wherein the frame rate is the number of frames per unit time of the display image.

6. The image processing apparatus according to claim 1, the processing further comprising:

executing an acquisition process configured to acquire the frame rate from the client machine.

7. The image processing apparatus according to claim 1, wherein each of the moving image data and the still image data is data encoded by the GPU.

8. The image processing apparatus according to claim 1, wherein the state of the GPU circuitry includes a memory bandwidth of the GPU circuitry, and the control process is configured to select the executing of the first transfer process in response that the memory bandwidth of the GPU circuitry is higher than a first threshold value and the frame rate is lower than a second threshold value.

9. A non-transitory computer-readable recording medium storing a screen transfer program which causes a processor of an image processing apparatus to transfer a display image to a client machine, the display image being an image to be displayed on a display device associated with the client machine, the program causing a graphics processing unit (GPU) included in the image processing apparatus to execute processing, the processing including:

executing a first transfer process configured to transfer only moving image data as the display image;

executing a second transfer process configured to transfer moving image data and still image data as the display image; and executing a control process configured to select either the executing of the first transfer process or the executing of the second transfer process, by using a frame rate of the display image and a state of a graphics processing unit (GPU) circuitry configured to perform a process related to an image, wherein the state of the GPU circuitry includes a processing load on the GPU circuitry, and the control process is configured to select the executing of the first transfer process in response that the processing load on the GPU circuitry is higher than a first threshold value and the frame rate is lower than a second threshold value.

* * * * *